(12) United States Patent
Garcia Garcia et al.

(10) Patent No.: US 10,839,014 B1
(45) Date of Patent: Nov. 17, 2020

(54) MULTIPLE REPRESENTATIONS OF A USER IN AN EMBEDDING SPACE

(71) Applicant: Facebook, Inc., Menlo Park, CA (US)

(72) Inventors: Dario Garcia Garcia, Redwood City, CA (US); Henry Richman Ehrenberg, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 195 days.

(21) Appl. No.: 16/100,088

(22) Filed: Aug. 9, 2018

(51) Int. Cl.
*G06F 16/901* (2019.01)
*G06K 9/62* (2006.01)
*G06F 16/9535* (2019.01)
*G06N 20/00* (2019.01)

(52) U.S. Cl.
CPC ...... *G06F 16/9024* (2019.01); *G06F 16/9535* (2019.01); *G06K 9/6256* (2013.01); *G06N 20/00* (2019.01)

(58) Field of Classification Search
CPC ............ G06F 16/9024; G06F 16/9535; G06K 9/6256; G06N 20/00
See application file for complete search history.

(56) References Cited

U.S. PATENT DOCUMENTS

| | | | | |
|---|---|---|---|---|
| 7,283,997 B1* | 10/2007 | Howard, Jr. | .......... | G06F 16/337 |
| 7,945,668 B1* | 5/2011 | Nucci | .................... | G06K 9/622 |
| | | | | 709/225 |
| 2013/0041949 A1* | 2/2013 | Biesecker | ............... | G06F 16/23 |
| | | | | 709/204 |
| 2015/0019640 A1* | 1/2015 | Li | .............................. | G06F 3/00 |
| | | | | 709/204 |
| 2018/0032888 A1* | 2/2018 | Modarresi | .............. | G06N 20/20 |
| 2018/0075137 A1* | 3/2018 | Lifar | ........................ | G06F 17/16 |

OTHER PUBLICATIONS

Gao, Sheng, et al. "A novel embedding method for information diffusion prediction in social network big data." IEEE Transactions on Industrial Informatics 13.4 (2017): 2097-2105 (Year: 2017).*

* cited by examiner

*Primary Examiner* — Tony Mahmoudi
*Assistant Examiner* — Umar Mian
(74) *Attorney, Agent, or Firm* — Baker Botts L.L.P.

(57) ABSTRACT

In one embodiment, a method includes preparing an initialized user-embedding matrix, where the user-embedding matrix includes multiple columns corresponding to a user, preparing an initialized concept-embedding matrix, constructing an interaction table representing interactions between entities, where an element (i,j) of the table indicates one or more directional interactions from an entity represented by row i to an entity represented by column j, running a training algorithm for the embeddings in the user-embedding matrix and in the concept-embedding matrix, where the training algorithm trains the embeddings such that embeddings representing entities with interactions are located nearby in the embedding space while embeddings representing entities without interactions are located far apart, and providing the embeddings in the user-embedding matrix and in the concept-embedding matrix to a downstream service.

18 Claims, 10 Drawing Sheets

MULTIPLE REPRESENTATIONS OF A USER IN AN EMBEDDING SPACE

TECHNICAL FIELD

This disclosure generally relates to generating entity embeddings.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, a social-networking system may generate multiple representations for a user in a multi-dimensional embedding space. Social-networking systems may utilize vector representations for entities (e.g., pages, groups, posts, users, etc.) in a common embedding space. The vector representation of entities in a common embedding space may be useful for a variety of user cases including search, advertisements, or any other suitable use cases. A vector representation in a multi-dimensional space may also be referred to as an embedding. Representing a user with a single embedding may not be appropriate because a person may have diverse interests. A single embedding representation for a person may not be sufficient to capture the interests and characteristics of the person. A system and method to generate a plurality of embeddings for a single user is proposed. Each of the embeddings may represent a specific interest or characteristic of the user. As an example and not by way of limitation, Alice, a social network user, likes classical music as well as rock music, especially heavy metal. Not many people who like classical music may be interested in heavy metal, and vice versa. Thus, embeddings associated with classical music may be far from embeddings associated with heavy metal. If Alice is represented by a single embedding, her embedding may be an averaged embedding for embeddings for classical music and embeddings for heavy metal. The averaged single embedding for Alice may represent neither classical music nor heavy metal. The social-networking system may generate multiple embedding representations for Alice: one for classical music, one for heavy metal, and others for her other interests.

In particular embodiments, the social-networking system may identify a list of unique social-networking users by searching the social graph. In particular embodiments, the social graph may include multiple nodes—which may include multiple user nodes or multiple concept nodes—and multiple edges connecting the nodes. The social-networking system may construct a user-embedding matrix based on the list of unique social-networking users. A column of the user-embedding matrix may represent an embedding for a social-networking user in a d-dimensional embedding space. The social-networking system may add a plurality of columns corresponding to a use. The social-networking system may initialize the user-embedding matrix with random numbers. The social-networking system may identify a list of unique social-networking concepts by searching the social graph. The social-networking concepts may comprise pages, groups, posts, events, any suitable concept represented by a node in the social graph. The social-networking system may construct a concept-embedding matrix based on the list of unique social-networking concepts. A column of the concept-embedding matrix may represent an embedding for a social-networking concept in the d-dimensional embedding space. The social-networking system may add one column corresponding to a concept. The social-networking system may initialize the concept-embedding matrix with random numbers. The social-networking system may construct an interaction table representing interactions between entities. Each column of the table may represent a social-networking entity and each row of the table may represent a social-networking entity. The entities in the interaction table may comprise social-networking users and social-networking concepts. To prepare the interaction table, the social-networking system may prepare an empty interaction table. The social-networking system may identify interactions between entities by searching the social graph. The social-networking system may record the identified interactions in the interaction table, where an element (i, j) of the table indicates one or more interactions from an entity represented by row i to an entity represented by column j. The social-networking system may run a training algorithm for the embeddings in the user-embedding matrix and in the concept-embedding matrix to train the embeddings such that embeddings representing entities with interactions are located nearby in the embedding space while embeddings representing entities without interactions are located far apart. While running the training algorithm, the social-networking system may select, for each pair of a user and an entity that have one or more interactions, k entities that do not have interactions with the user. The social-networking system may compute a margin ranking loss for the pair. The margin ranking loss may comprise scores for the k pairs between the user and the selected k entities and a score for the pair of the user and the entity. In particular embodiments, the scores may be Max-scores. A Max-score for a pair of a user and an entity may be computed based on a similarity between a user embedding corresponding to the user closest to an entity embedding corresponding to the entity and the entity embedding. In particular embodiments, the scores may be Smooth-max-scores. A Smooth-max-score for a pair of a user and an entity may be computed based on weighted functions of similarity between user embeddings corresponding to the user and an entity embedding corresponding to the entity. The social-networking system may adjust parameters based on the training algorithm to minimize the margin ranking loss. The social-networking system may run one or more supervised trainings in parallel to the training for the embeddings in the user-embedding matrix and in the concept-embedding matrix. In particular embodiments, the one or more supervised trainings may comprise a classification training. In particular embodiments, the one or more supervised trainings may comprise a regression training. After the training algorithm finishes, the social-networking system may provide the embeddings in the user-embedding matrix and in the concept-embedding matrix to a downstream service. The social-networking system may determine whether the downstream stream service is not capable of handling a plurality of embeddings for a user. The social-networking system may create, in response to the determination, an embedding for a user by performing a weighted average of user embeddings corresponding to the user.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
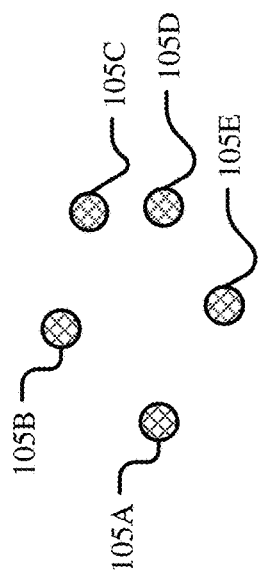
FIG. 1 illustrates an example of single representation for a user in a common embedding space.
Figure 1:
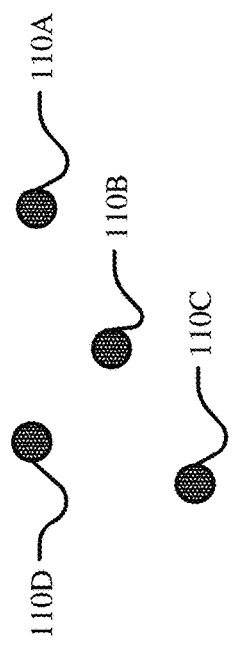

In particular embodiments, a social-networking system 660 may generate multiple representations for a user in a multi-dimensional embedding space. Social-networking system 660 may utilize vector representations for entities (e.g., pages, groups, posts, users, etc.) in a common embedding space 800. The vector representation of entities in a common embedding space 800 may be useful for a variety of user cases including search, advertisements, or any other suitable use cases. A vector representation in a multi-dimensional space may also be referred to as an embedding. Representing a user with a single embedding may not be appropriate because a person may have diverse interests. A single embedding representation for a person may not be sufficient to capture the interests and characteristics of the person. A system and method to generate a plurality of embeddings for a single user is proposed. Each of the embeddings may represent a specific interest or characteristic of the user. As an example and not by way of limitation, Alice, a social network user, likes classical music as well as rock music, especially heavy metal. Not many people who like classical music may be interested in heavy metal, and vice versa. Thus, embeddings associated with classical music may be far from embeddings associated with heavy metal. If Alice is represented by a single embedding, her embedding may be an averaged embedding for embeddings for classical music and embeddings for heavy metal. The averaged single embedding for Alice may represent neither classical music nor heavy metal. The social-networking system 660 may generate multiple embedding representations for Alice: one for classical music, one for heavy metal, and others for her other interests. Although this disclosure describes generating a plurality of representations for a user in the embedding space in a particular manner, this disclosure contemplates generating a plurality of representations for a user in the embedding space in any suitable manner.

In particular embodiments, the social-networking system 660 may identify a list of unique social-networking users by searching the social graph. In particular embodiments, the social graph may include multiple nodes—which may include multiple user nodes or multiple concept nodes—and multiple edges connecting the nodes. The social-networking system 660 may construct a user-embedding matrix based on the list of unique social-networking users. A column of the user-embedding matrix may represent an embedding for a social-networking user in a d-dimensional embedding space 800. The social-networking system 660 may add a plurality of columns corresponding to a use. The social-networking system 660 may initialize the user-embedding matrix with random numbers. The social-networking system 660 may identify a list of unique social-networking concepts by searching the social graph. The social-networking concepts may comprise pages, groups, posts, events, any suitable concept represented by a node in the social graph. The social-networking system 660 may construct a concept-embedding matrix based on the list of unique social-networking concepts. A column of the concept-embedding matrix may represent an embedding for a social-networking concept in the d-dimensional embedding space 800. The social-networking system 660 may add one column corresponding to a concept. The social-networking system 660 may initialize the concept-embedding matrix with random numbers. The social-networking system 660 may construct an interaction table representing interactions between entities. Each column of the table may represent a social-networking entity and each row of the table may represent a social-networking entity. The entities in the interaction table may comprise social-networking users and social-networking concepts. To prepare the interaction table, the social-networking system 660 may prepare an empty interaction table. The social-networking system 660 may identify interactions between entities by searching the social graph. The social-networking system 660 may record the identified interactions in the interaction table, where an element (i, j) of the table indicates one or more interactions from an entity represented by row i to an entity represented by column j. The social-networking system 660 may run a training algorithm for the embeddings in the user-embedding matrix and in the concept-embedding matrix to train the embeddings such that embeddings representing entities with interactions are located nearby in the embedding space 800 while embeddings representing entities without interactions are located far apart. While running the training algorithm, the social-networking system 660 may select, for each pair of a user and an entity that have one or more interactions, k entities that do not have interactions with the user. The social-networking system 660 may compute a margin ranking loss for the pair. The margin ranking loss may comprise scores for the k pairs between the user and the selected k entities and a score for the pair of the user and the entity. In particular embodiments, the scores may be Max-scores. A Max-score for a pair of a user and an entity may be computed based on a similarity between a user embedding corresponding to the user closest to an entity embedding corresponding to the entity and the entity embedding. In particular embodiments, the scores may be Smooth-max-scores. A Smooth-max-score for a pair of a user and an entity may be computed based on weighted functions of similarity between user embeddings corresponding to the user and an entity embedding corresponding to the entity. The social-networking system 660 may adjust parameters based on the training algorithm to minimize the margin ranking loss. The social-networking system 660 may run one or more supervised trainings in parallel to the training for the embeddings in the user-embedding matrix and in the concept-embedding matrix. In particular embodiments, the one or more supervised trainings may comprise a classification training. In particular embodiments, the one or more supervised trainings may comprise a regression training. After the training algorithm finishes, the social-networking system 660 may provide the embeddings in the user-embedding matrix and in the concept-embedding matrix to a downstream service. The social-networking system 660 may determine whether the downstream stream service is not capable of handling a plurality of embeddings for a user. The social-networking system 660 may create, in response to the determination, an embedding for a user by performing a weighted average of user embeddings corresponding to the user.

Figure 2:
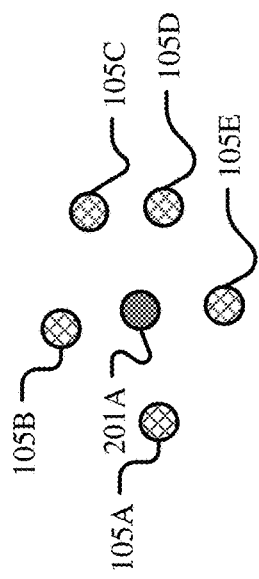
FIG. 2 illustrates an example of multiple representations for a user in a common embedding space.
Figure 2:
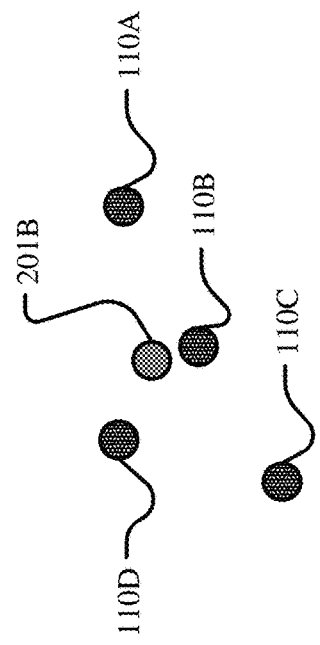

In particular embodiments, the social-networking system 660 may utilize vector representations for entities in a common embedding space 800. The social-networking system 660 may train the embeddings corresponding entities based interactions between entities such that entities having interactions may be located nearby in the embedding space 800 while entities not having interactions may be located far apart. Representing a user with a single embedding may not be appropriate because a person may have diverse interests. A single embedding representation for a person may not be sufficient to capture the interests and characteristics of the person. FIG. 1 illustrates an example of single representation for a user in a common embedding space. As an example and not by way of limitation, illustrated in FIG. 1, Alice, a social network user, may like classical music as well as rock music, especially heavy metal. Alice may have interactions with two types of entities, some of them associated with classical music (e.g., events for classical concerts and opera performances, posts regarding the opera house, group of classical fans, etc.) and other ones associated with heavy metal. FIG. 1 shows the common embedding space 100 as a 2-dimensional space for illustration purpose though the embedding space 100 is high-dimensional. The entity embeddings 105A, 105B, 105C, 105D and 105E may correspond to entities associated with classical music while the entity embeddings 110A, 110B, 110C and 110D may correspond to entities associated with heavy metal. If Alice is represented by a single user embedding in the embedding space, the training algorithm may locate the corresponding embedding 101 in the middle of embeddings corresponding to classical music related entities and embeddings corresponding to heavy metal. The embedding 101 may not represent Alice properly as the location of the embedding 101 may be far from classical music embeddings as well as from heavy metal embeddings. FIG. 2 illustrates an example of multiple representations for a user in a common embedding space. In this example, Alice is represented by two embeddings 201A and 201B. Alice may be represented by more than two embeddings but the other embeddings are not shown in FIG. 2. The training algorithm may progressively move embedding 201A for Alice closer to the embeddings 105A, 105B, 105C, 105D and 105E corresponding to classical music related entities. When the training algorithm encounters interactions of Alice with entities associated with heavy metal, the training algorithm may move embedding 201B for Alice closer to the embeddings 110A, 110B, 110C and 110D corresponding to entities associated with heavy metal instead of moving the embedding 201A closer to the embeddings 110A, 110B, 110C and 110D. The generated embeddings 201A and 201B may represent Alice properly because 201A may be close to embeddings corresponding to entities associated with classical music and 201B may be close to embeddings corresponding to entities associated with heavy metal.

Figure 3:
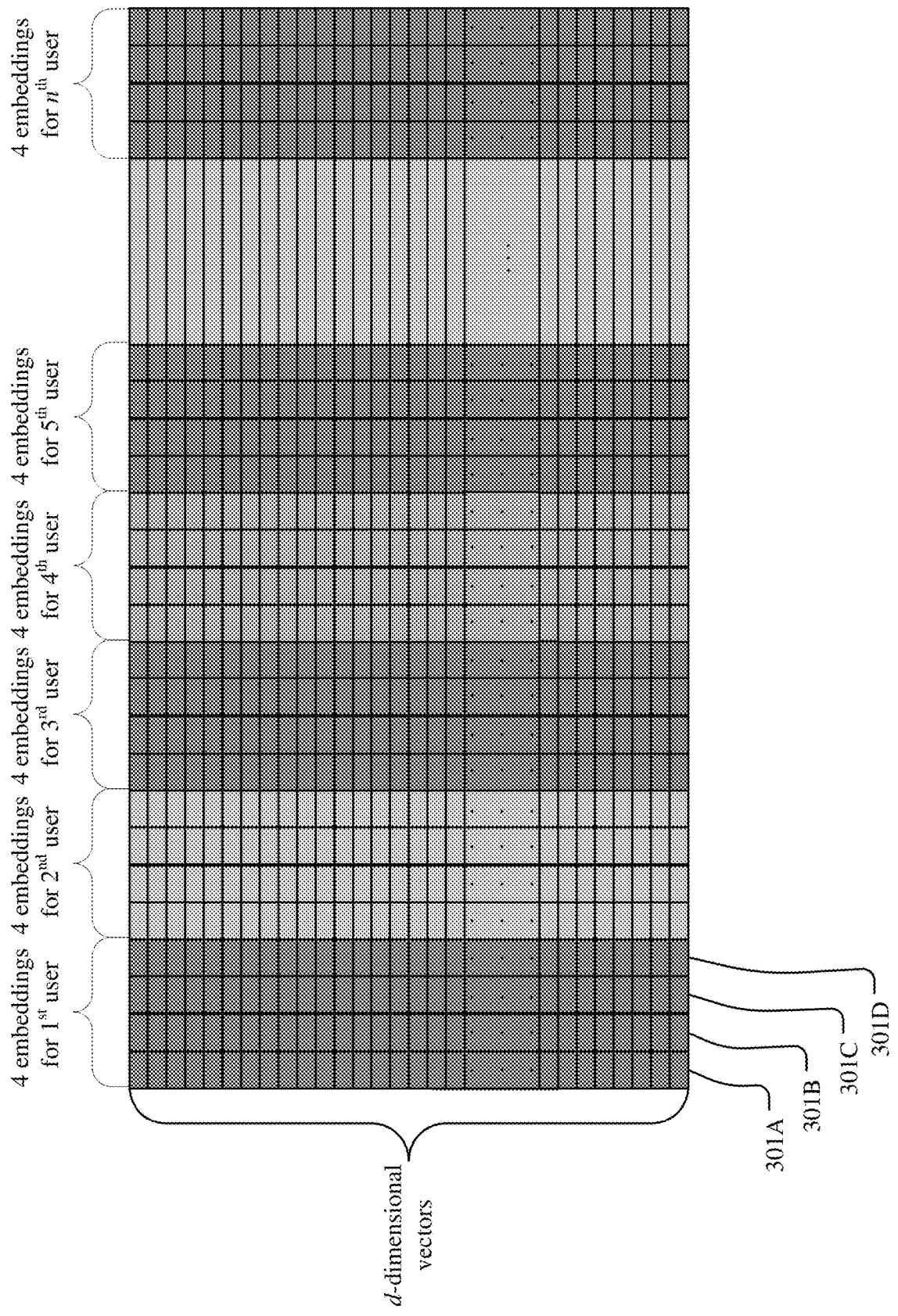
FIG. 3 illustrates an example user-embedding matrix.

In particular embodiments, the social graph 700 may include multiple nodes—which may include multiple user nodes 702 or multiple concept nodes 704—and multiple edges 706 connecting the nodes. In particular embodiments, the social-networking system 660 may identify a list of unique social-networking users by searching the social graph 700. The social-networking system 660 may construct a user-embedding matrix based on the list of unique social-networking users. A column of the user-embedding matrix may represent an embedding for a social-networking user in a d-dimensional embedding space 800. The social-networking system 660 may add a plurality of columns corresponding to a use. FIG. 3 illustrates an example user-embedding matrix. Each column of the user-embedding matrix may represent an embedding vector for a user. The example user-embedding matrix illustrated in FIG. 3 may comprise 4 embeddings for each user. For example, first four columns 301A, 301B, 301C and 301D may correspond to the first user. The next four columns may represent embedding vectors for the second user. The user-embedding matrix comprises a plurality of user embeddings for n users, where n is the number of unique users in the social-network. A user embedding vector may comprise d elements, where each element may comprise a real number representing a coordinate in the d-dimensional embedding space 800. The social-networking system 660 may initialize the user-embedding matrix with random numbers. Although this disclosure describes a particular data structure comprising a plurality of user embeddings per user, this disclosure contemplates any suitable data structure comprising a plurality of user embeddings per user.

Figure 4:
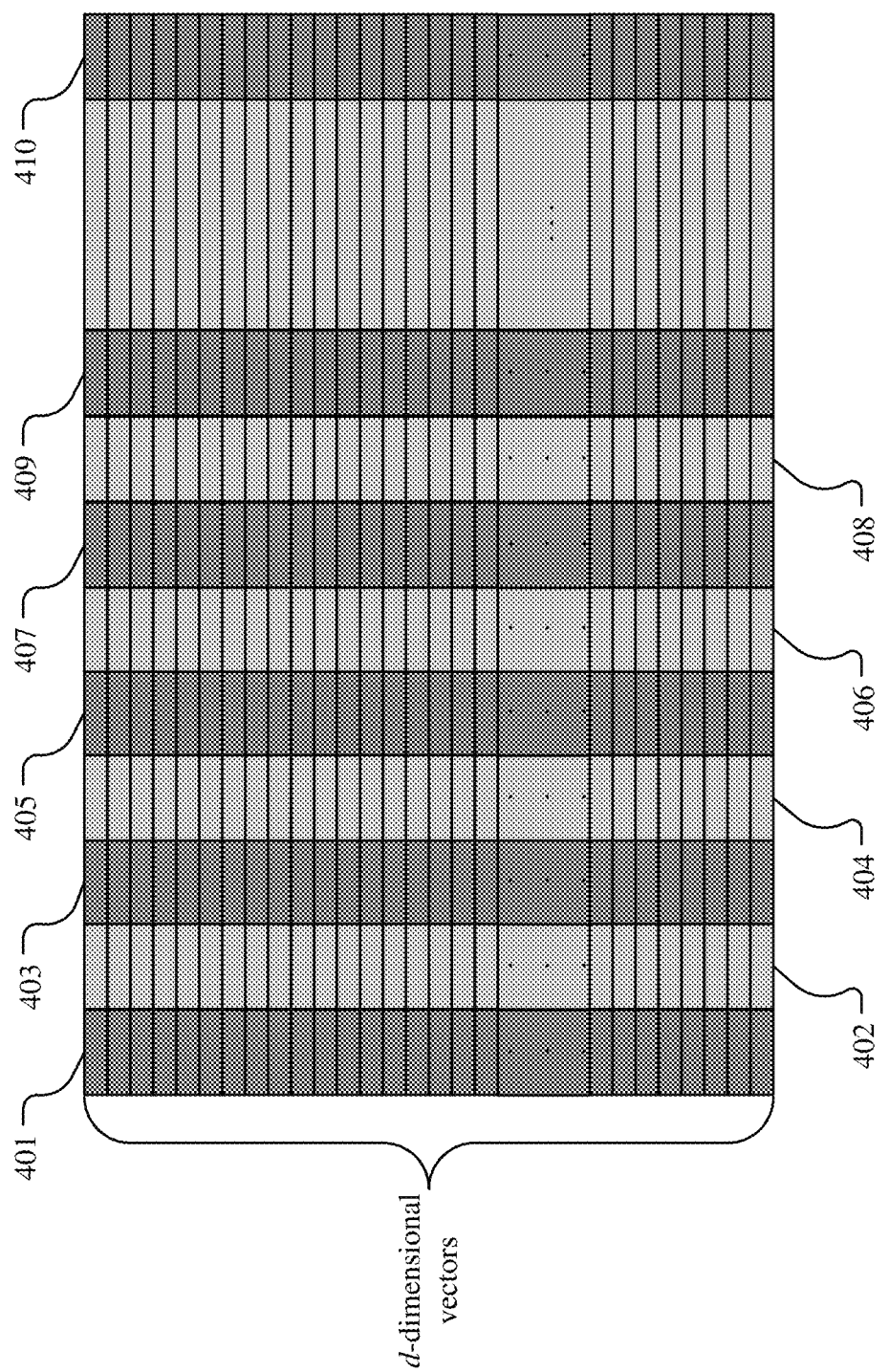
FIG. 4 illustrates an example concept-embedding matrix.

In particular embodiments, the social-networking system 660 may identify a list of unique social-networking concepts by searching the social graph 700. The social-networking concepts may comprise pages, groups, posts, events, any suitable concept represented by a concept node 704 in the social graph 700. The social-networking system 660 may construct a concept-embedding matrix based on the list of unique social-networking concepts. FIG. 4 illustrates an example concept-embedding matrix. A column of the concept-embedding matrix may represent an embedding corresponding to a social-networking concept in the d-dimensional embedding space 800. A concept embedding vector may comprise d elements, where each element may comprise a real number representing a coordinate in the d-dimensional embedding space 800. The social-networking system 660 may prepare a column on the concept-embedding matrix for each identified unique concept. In the example illustrated in FIG. 4, The first column 401 may correspond to the first identified social-networking concept. The second column 402 may correspond to the second identified social-networking concept. The columns 403, 404, 405, 406, 407, 408 and 409 may correspond to the respectively identified social-networking concepts. The last column 410 of the concept-embedding matrix may correspond to the m-th identified social-networking concept, wherein m is the number of identified social-networking concept in the social network. The social-networking system 660 may initialize the concept-embedding matrix with random numbers. Although this disclosure describes a particular data structure comprising one embedding per identified social-networking concept in the social network, this disclosure contemplates any suitable data structure comprising one embedding per identified social-networking concept in the social network.

In particular embodiments, the social-networking system 660 may identity interactions between entities and prepare a list of the identified interactions in a form of data structure. In particular embodiments, the social-networking system 660 may construct an interaction table representing interactions between entities. Each column of the table may represent a social-networking entity and each row of the table may represent a social-networking entity. The entities in the interaction table may comprise social-networking users and social-networking concepts. To prepare the interaction table, the social-networking system 660 may prepare an empty interaction table. The social-networking system 660 may identify interactions between entities by searching the social graph. The social-networking system 660 may record the identified interactions in the interaction table, where an element (i, j) of the table indicates one or more interactions from an entity represented by row i to an entity represented by column j. As an example and not by way of limitation, the social-networking system 660 may identify that a social-networking user represented by i-th row of the interaction table has created a social-networking post represented by j-th column of the interaction table. The social-networking system 660 may record the creation interaction to the element (i, j) of the interaction table. As another example and not by way of limitation, the social-networking system 660 may identify that a social-networking user represented by k-th row of the interaction table liked a social-networking concept represented by l-th column of the interaction table. The social-networking system 660 may record the 'like' interaction to the element (k, l) of the interaction table. As yet another example and not by way of limitation, the social-networking system 660 may identify that a social-networking user represented by m-th row of the interaction table is a friend of a social-networking user represented by n-th column of the interaction table. The social-networking system 660 may record the 'friend' interaction to the element (m, n) of the interaction table. In particular embodiments, the social-networking system 660 may record more than one interactions to an element of the interaction table. Although this disclosure describes a particular data structure comprising records for interactions between social-networking entities, this disclosure contemplates any suitable data structure comprising records for interactions between social-networking entities.

In particular embodiments, the social-networking system 660 may run a training algorithm for the embeddings in the user-embedding matrix and in the concept-embedding matrix to train the embeddings such that embeddings representing entities with interactions are located nearby in the embedding space while embeddings representing entities without interactions are located far apart. While running the training algorithm, the social-networking system 660 may compute a margin ranking loss for each pair of a user x and an entity y that have one or more interactions. To compute the margin ranking loss, the social-networking system 660 may randomly select K entities $\tilde{y}_k$, k=1, 2, ..., K, that do not have interactions with the user and formulate the margin ranking loss as:

$$\text{Loss}_\gamma(x, y \mid w, U, V) = \sum_{k=1}^{K} (S(x, \tilde{y}_k \mid w, U, V) + \gamma - S(x, y \mid w, U, V))_+$$

where $S(x,y|w,U,V)$ is a score between user x and the entity y, $S(x,\tilde{y}_k|w,U,V)$ is a score between user x and one of the randomly selected K entities $\tilde{y}_k$, k=1, 2, ..., K $\tilde{y}_k$, and $\gamma$ is the margin width. The social-networking system 660 may, while running the training algorithm, adjust parameters based on the training algorithm to minimize the cost function, which is a sum of the margin ranking losses for all the pairs of entities having interactions by adjusting locations of corresponding embeddings in the embedding space 800. In particular embodiments, the scores may be Max-scores. A Max-score for a pair of a user x and the entity y may be calculated as:

$$S(x, y \mid w, U, V) = \max_i \cos(U_i(x), V(y)),$$

where $\cos(U_i(x),V(y))$ is a cosine similarity between i-th user embedding for user x and entity embedding for entity y. Thus, the Max-score for the pair of user x and entity y may be calculated based on the cosine similarity between a user embedding corresponding to the user x closest to the entity embedding corresponding to the entity y and the entity embedding. When the Max-scores are used as scores, the social-networking system 660 may move only the closest user embedding closer to the entity embedding while not move the other user embeddings corresponding to user x. In particular embodiments, the scores may be Smooth-max-scores. A Smooth-max score for a pair of a user x and the entity y may be calculated as:

$$S_\alpha(x, y \mid w, U, V) = \frac{\sum_i w_i(x) s_i \exp(\alpha \cdot s_i)}{\sum_i \exp(\alpha \cdot s_i)},$$

where $s_i = \cos(U_i(x),V(y))$ The Smooth-max-score for a pair of a user x and an entity y may be computed based on weighted functions of similarities between user embeddings corresponding to user x and an entity embedding corresponding to the entity y. When the Smooth-max scores are used as scores, the social-networking system 660 may adjust locations in the embedding space 800 for all the user embeddings corresponding to the user. The degree of adjustment may be proportional to assigned weight to each embedding. Although this disclosure describes a particular embedding training algorithm for generating multiple user representations in an embedding space, this disclosure contemplates any suitable embedding training algorithm for generating multiple user representations in an embedding space.

In particular embodiments, the social-networking system 660 may run one or more supervised trainings in parallel to the training for the embeddings in the user-embedding matrix and in the concept-embedding matrix. Running more than one training algorithms in parallel may improve the quality of embeddings. In particular embodiments, the one or more supervised trainings may comprise a classification training. As an example and not by way of limitation, the social-networking system 660 may run a supervised classification training to predict where a user is a male or female based on the identified interactions at the same time the social-networking system 660 runs the embedding training algorithm. The classification training may improve the quality of both user embeddings and concept embeddings. In particular embodiments, the one or more supervised trainings may comprise a regression training. As an example and not by way of limitation, the social-networking system 660 may run a supervised training for predicting ages of the user based on the identified interactions in parallel to the training for the embeddings. As another example and not by way of limitation, the social-networking system 660 may run a supervised training for predicting income levels of the users based on the identified interactions in parallel to the training for the embeddings. Although this disclosure describes running one or more supervised trainings in parallel to the training for the embeddings in a particular manner, this disclosure contemplates running one or more supervised trainings in parallel to the training for the embeddings in any suitable manner.

In particular embodiments, the social-networking system 660 may provide the embeddings in the user-embedding matrix and in the concept-embedding matrix to a downstream service. The downstream service may be a legacy service that is not capable of handling multiple user embeddings for a user. The social-networking system 660 may determine whether the downstream stream service is not capable of handling a plurality of embeddings for a user. The social-networking system 660 may create, in response to the determination, an embedding for a user by performing a weighted average of user embeddings corresponding to the user. Though generating multiple embeddings only to merge them into a single embedding for the user may seem to be waste of resources, the training algorithm generating multiple embeddings for each user may generate better quality entity embeddings. Entity embeddings trained by an algorithm for multiple user embeddings per user may have higher similarities with embeddings corresponding to entities with interactions than entity embeddings trained by an algorithm for single user embedding per user. As an example and not by way of limitation, the social-networking system 660 may need to provide the generated embeddings to an advertisement matching service. The advertisement matching service may identify one or more matched advertisements based on users' interests. The social-networking system 660 may determine whether the advertisement matching service is not capable of handling more than one embeddings per user. Because the advertisement matching service may be able to handle more than one embeddings per user, the social-networking system 660 may provide a plurality of user embeddings per user. As another example and not by way of limitation, the social-networking system 660 may need to provide the generated embeddings to a group suggestion service. The group suggestion service may identify one or more groups that may interest the user based on embeddings and suggest the identified groups to the users. Because the group suggestion service in this example has not upgraded, the group suggestion service may not be able to handle multiple user embeddings per user. The social-networking system 660 may, for each user, create a single user embedding by performing a weighted average of the generated multiple user embeddings corresponding to the user. The social-networking system 660 may provide the averaged single user embedding to the group suggestion service. Although this disclosure describes providing generated embeddings to a downstream service in a particular manner, this disclosure contemplates providing generated embeddings to a downstream service in any suitable manner.

Figure 5:
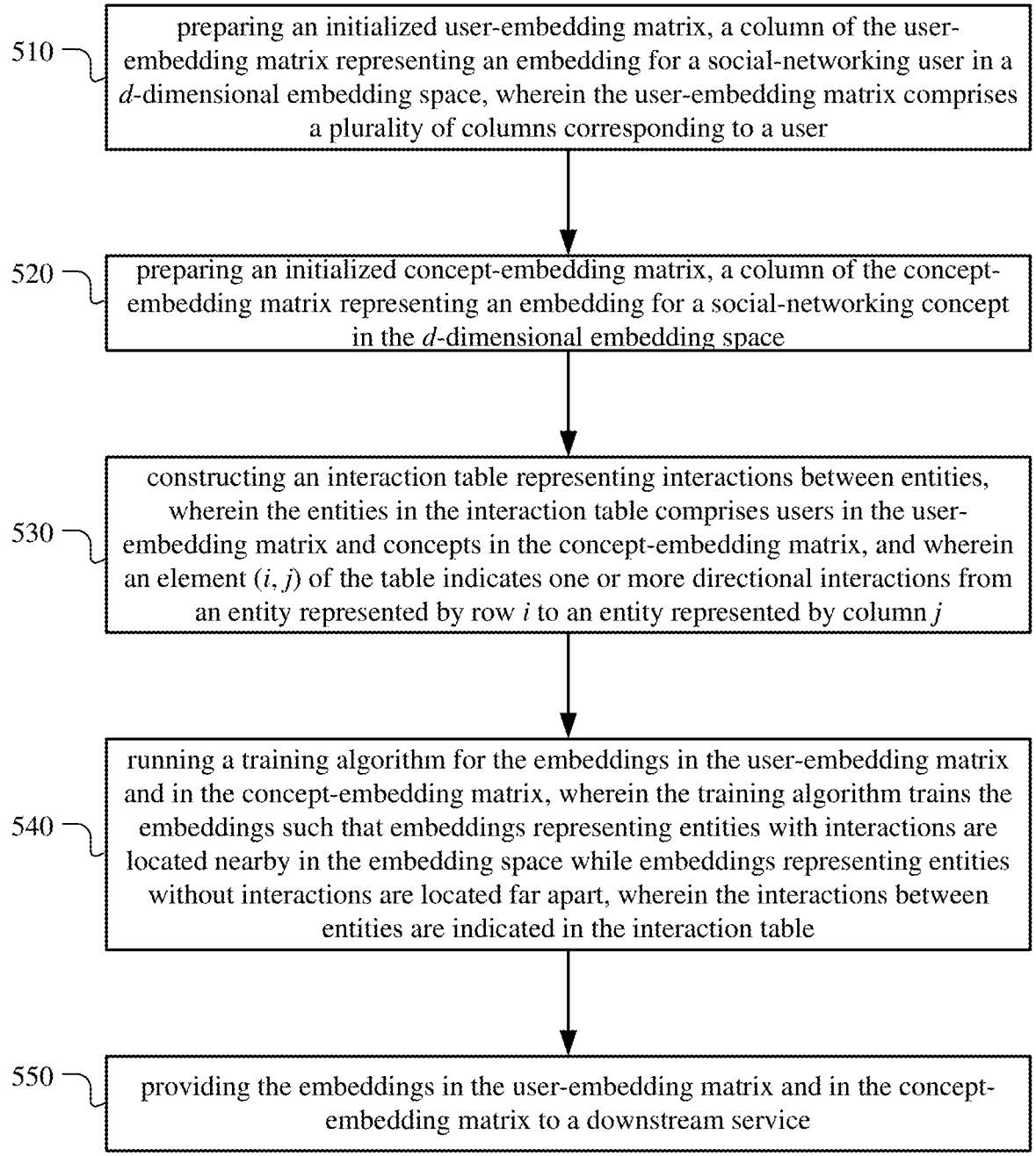
FIG. 5 illustrates an example method for utilizing a plurality of representations per user in a d-dimensional embedding space.

FIG. 5 illustrates an example method 500 for utilizing a plurality of representations per user in a d-dimensional embedding space. The method may begin at step 510, where the social-networking system 660 may prepare an initialized user-embedding matrix, a column of the user-embedding matrix representing an embedding for a social-networking user in a d-dimensional embedding space, wherein the user-embedding matrix comprises a plurality of columns corresponding to a user. At step 520, the social-networking system 660 may prepare an initialized concept-embedding matrix, a column of the concept-embedding matrix representing an embedding for a social-networking concept in the d-dimensional embedding space. At step 530, the social-networking system 660 may construct an interaction table representing interactions between entities, wherein the entities in the interaction table comprises users in the user-embedding matrix and concepts in the concept-embedding matrix, and wherein an element (i,j) of the table indicates one or more directional interactions from an entity represented by row i to an entity represented by column j. At step 540, the social-networking system 660 may run a training algorithm for the embeddings in the user-embedding matrix and in the concept-embedding matrix, wherein the training algorithm trains the embeddings such that embeddings representing entities with interactions are located nearby in the embedding space while embeddings representing entities without interactions are located far apart, wherein the interactions between entities are indicated in the interaction table. At step 550, the social-networking system 660 may providing the embeddings in the user-embedding matrix and in the concept-embedding matrix to a downstream service. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for utilizing a plurality of representations per user in a d-dimensional embedding space including the particular steps of the method of FIG. 5, this disclosure contemplates any suitable method for utilizing a plurality of representations per user in a d-dimensional embedding space including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

System Overview

Figure 6:
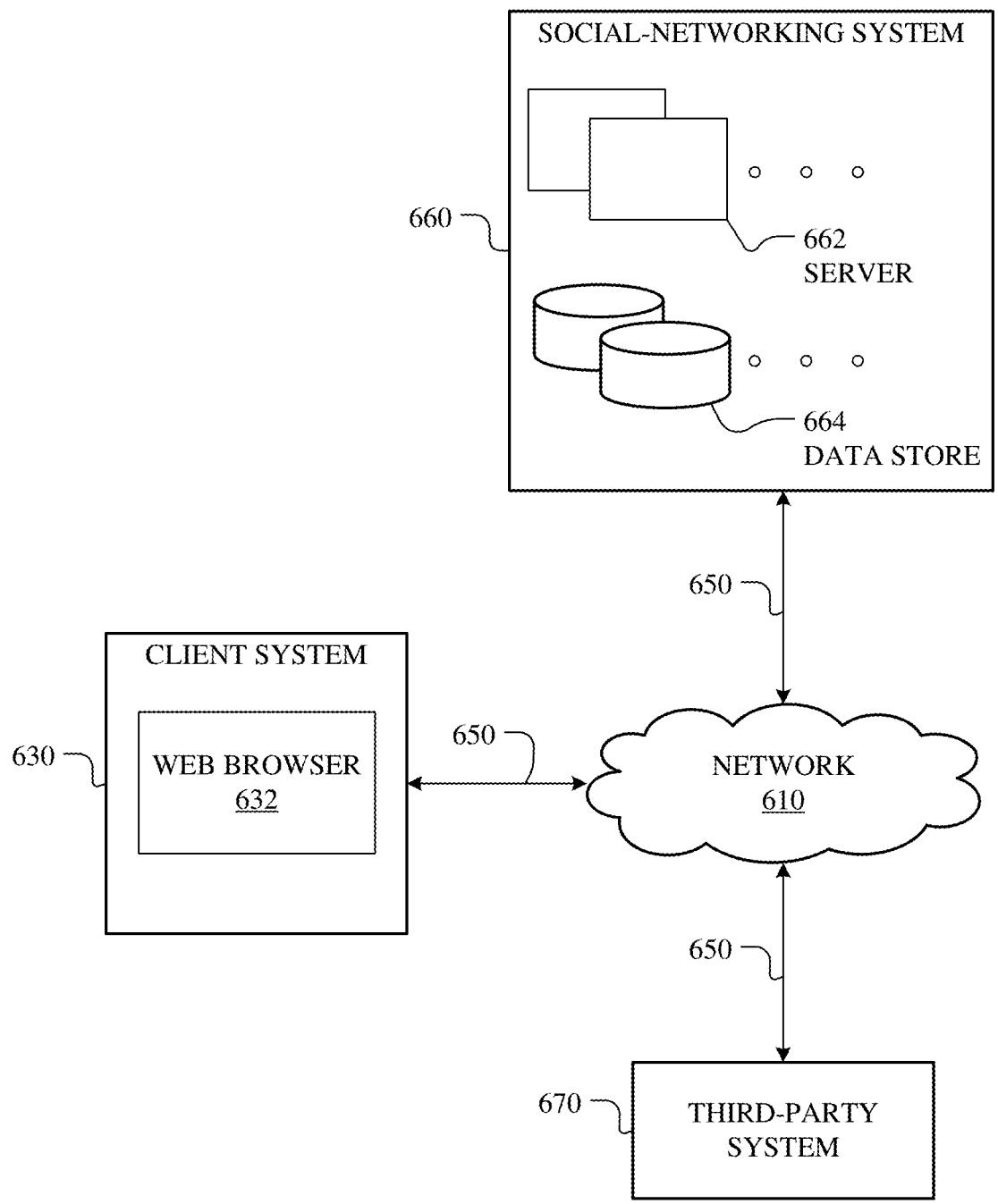
FIG. 6 illustrates an example network environment associated with a social-networking system.

FIG. 6 illustrates an example network environment 600 associated with a social-networking system. Network environment 600 includes a client system 630, a social-networking system 660, and a third-party system 670 connected to each other by a network 610. Although FIG. 6 illustrates a particular arrangement of client system 630, social-networking system 660, third-party system 670, and network 610, this disclosure contemplates any suitable arrangement of client system 630, social-networking system 660, third-party system 670, and network 610. As an example and not by way of limitation, two or more of client system 630, social-networking system 660, and third-party system 670 may be connected to each other directly, bypassing network 610. As another example, two or more of client system 630, social-networking system 660, and third-party system 670 may be physically or logically co-located with each other in whole or in part. Moreover, although FIG. 6 illustrates a particular number of client systems 630, social-networking systems 660, third-party systems 670, and networks 610, this disclosure contemplates any suitable number of client systems 630, social-networking systems 660, third-party systems 670, and networks 610. As an example and not by way of limitation, network environment 600 may include multiple client system 630, social-networking systems 660, third-party systems 670, and networks 610.

This disclosure contemplates any suitable network 610. As an example and not by way of limitation, one or more portions of network 610 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 610 may include one or more networks 610.

Links 650 may connect client system 630, social-networking system 660, and third-party system 670 to communication network 610 or to each other. This disclosure contemplates any suitable links 650. In particular embodiments, one or more links 650 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 650 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 650, or a combination of two or more such links 650. Links 650 need not necessarily be the same throughout network environment 600. One or more first links 650 may differ in one or more respects from one or more second links 650.

In particular embodiments, client system 630 may be an electronic device including hardware, software, or embedded logic components or a combination of two or more such components and capable of carrying out the appropriate functionalities implemented or supported by client system 630. As an example and not by way of limitation, a client system 630 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 630. A client system 630 may enable a network user at client system 630 to access network 610. A client system 630 may enable its user to communicate with other users at other client systems 630.

In particular embodiments, client system 630 may include a web browser 632, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 630 may enter a Uniform Resource Locator (URL) or other address directing the web browser 632 to a particular server (such as server 662, or a server associated with a third-party system 670), and the web browser 632 may generate a Hyper Text Transfer Protocol (HTTP) request and communicate the HTTP request to server. The server may accept the HTTP request and communicate to client system 630 one or more Hyper Text Markup Language (HTML) files responsive to the HTTP request. Client system 630 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 660 may be a network-addressable computing system that can host an online social network. Social-networking system 660 may generate, store, receive, and send social-networking data, such as, for example, user-profile data, concept-profile data, social-graph information, or other suitable data related to the online social network. Social-networking system 660 may be accessed by the other components of network environment 600 either directly or via network 610. As an example and not by way of limitation, client system 630 may access social-networking system 660 using a web browser 632, or a native application associated with social-networking system 660 (e.g., a mobile social-networking application, a messaging application, another suitable application, or any combination thereof) either directly or via network 610. In particular embodiments, social-networking system 660 may include one or more servers 662. Each server 662 may be a unitary server or a distributed server spanning multiple computers or multiple datacenters. Servers 662 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 662 may include hardware, software, or embedded logic components or a combination of two or more such components for carrying out the appropriate functionalities implemented or supported by server 662. In particular embodiments, social-networking system 660 may include one or more data stores 664. Data stores 664 may be used to store various types of information. In particular embodiments, the information stored in data stores 664 may be organized according to specific data structures. In particular embodiments, each data store 664 may be a relational, columnar, correlation, or other suitable database. Although this disclosure describes or illustrates particular types of databases, this disclosure contemplates any suitable types of databases. Particular embodiments may provide interfaces that enable a client system 630, a social-networking system 660, or a third-party system 670 to manage, retrieve, modify, add, or delete, the information stored in data store 664.

In particular embodiments, social-networking system 660 may store one or more social graphs in one or more data stores 664. In particular embodiments, a social graph may include multiple nodes—which may include multiple user nodes (each corresponding to a particular user) or multiple concept nodes (each corresponding to a particular concept)—and multiple edges connecting the nodes. Social-networking system 660 may provide users of the online social network the ability to communicate and interact with other users. In particular embodiments, users may join the online social network via social-networking system 660 and then add connections (e.g., relationships) to a number of other users of social-networking system 660 to whom they want to be connected. Herein, the term "friend" may refer to any other user of social-networking system 660 with whom a user has formed a connection, association, or relationship via social-networking system 660.

In particular embodiments, social-networking system 660 may provide users with the ability to take actions on various types of items or objects, supported by social-networking system 660. As an example and not by way of limitation, the items and objects may include groups or social networks to which users of social-networking system 660 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 660 or by an external system of third-party system 670, which is separate from social-networking system 660 and coupled to social-networking system 660 via a network 610.

In particular embodiments, social-networking system 660 may be capable of linking a variety of entities. As an example and not by way of limitation, social-networking system 660 may enable users to interact with each other as well as receive content from third-party systems 670 or other entities, or to allow users to interact with these entities through an application programming interfaces (API) or other communication channels.

In particular embodiments, a third-party system 670 may include one or more types of servers, one or more data stores, one or more interfaces, including but not limited to APIs, one or more web services, one or more content sources, one or more networks, or any other suitable components, e.g., that servers may communicate with. A third-party system 670 may be operated by a different entity from an entity operating social-networking system 660. In particular embodiments, however, social-networking system 660 and third-party systems 670 may operate in conjunction with each other to provide social-networking services to users of social-networking system 660 or third-party systems 670. In this sense, social-networking system 660 may provide a platform, or backbone, which other systems, such as third-party systems 670, may use to provide social-networking services and functionality to users across the Internet.

In particular embodiments, a third-party system 670 may include a third-party content object provider. A third-party content object provider may include one or more sources of content objects, which may be communicated to a client system 630. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 660 also includes user-generated content objects, which may enhance a user's interactions with social-networking system 660. User-generated content may include anything a user can add, upload, send, or "post" to social-networking system 660. As an example and not by way of limitation, a user communicates posts to social-networking system 660 from a client system 630. Posts may include data such as status updates or other textual data, location information, photos, videos, links, music or other similar data or media. Content may also be added to social-networking system 660 by a third-party through a "communication channel," such as a newsfeed or stream.

In particular embodiments, social-networking system 660 may include a variety of servers, sub-systems, programs, modules, logs, and data stores. In particular embodiments, social-networking system 660 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 660 may also include suitable components such as network interfaces, security mechanisms, load balancers, failover servers, management-and-network-operations consoles, other suitable components, or any suitable combination thereof. In particular embodiments, social-networking system 660 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 660 to one or more client systems 630 or one or more third-party system 670 via network 610. The web server may include a mail server or other messaging functionality for receiving and routing messages between social-networking system 660 and one or more client systems 630. An API-request server may allow a third-party system 670 to access information from social-networking system 660 by calling one or more APIs. An action logger may be used to receive communications from a web server about a user's actions on or off social-networking system 660. In conjunction with the action log, a third-party-content-object log may be maintained of user exposures to third-party-content objects. A notification controller may provide information regarding content objects to a client system 630. Information may be pushed to a client system 630 as notifications, or information may be pulled from client system 630 responsive to a request received from client system 630. Authorization servers may be used to enforce one or more privacy settings of the users of social-networking system 660. A privacy setting of a user determines how particular information associated with a user can be shared. The authorization server may allow users to opt in to or opt out of having their actions logged by social-networking system 660 or shared with other systems (e.g., third-party system 670), such as, for example, by setting appropriate privacy settings. Third-party-content-object stores may be used to store content objects received from third parties, such as a third-party system 670. Location stores may be used for storing location information received from client systems 630 associated with users. Advertisement-pricing modules may combine social information, the current time, location information, or other suitable information to provide relevant advertisements, in the form of notifications, to a user.

Social Graphs

Figure 7:
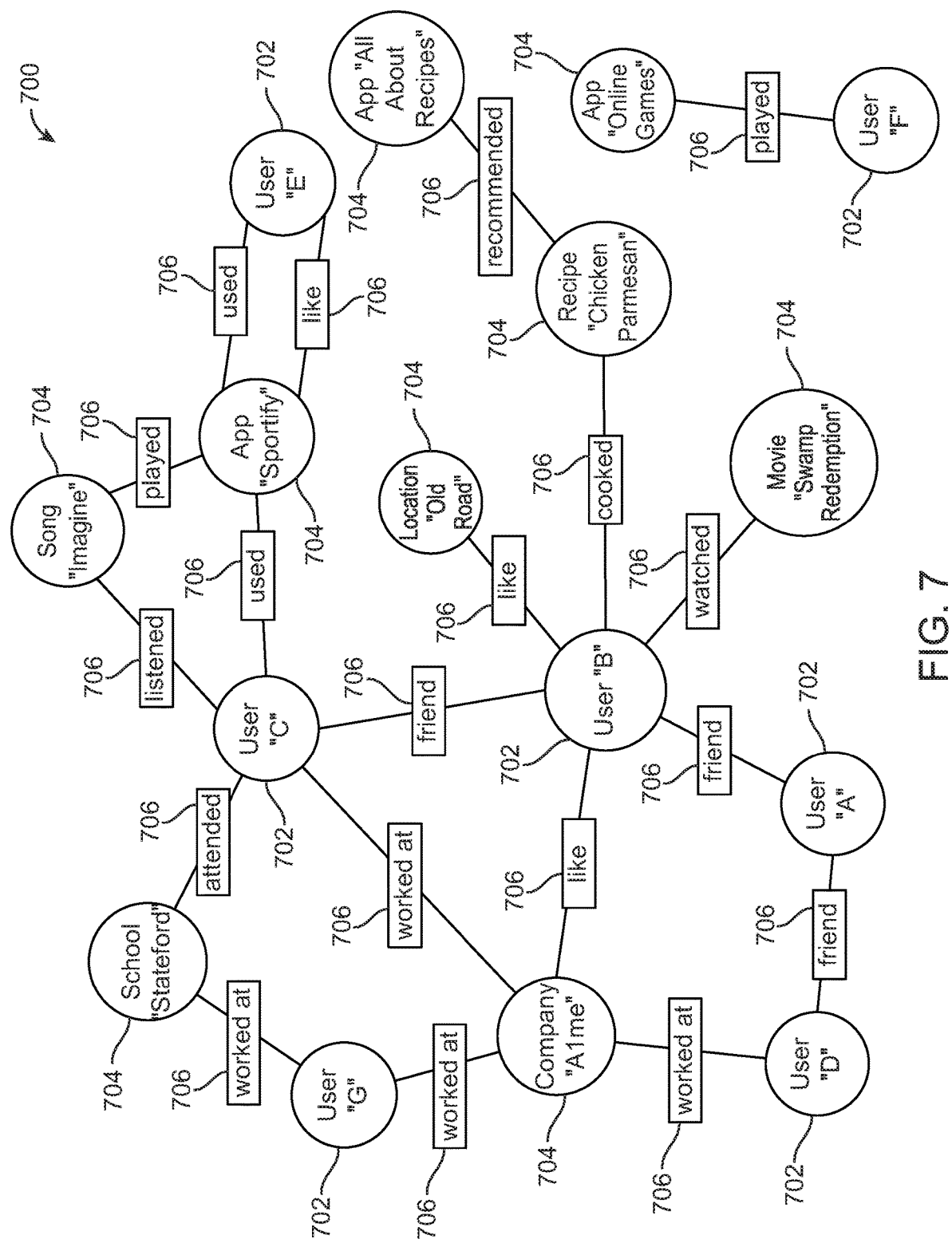
FIG. 7 illustrates an example social graph.

FIG. 7 illustrates example social graph 700. In particular embodiments, social-networking system 660 may store one or more social graphs 700 in one or more data stores. In particular embodiments, social graph 700 may include multiple nodes—which may include multiple user nodes 702 or multiple concept nodes 704—and multiple edges 706 connecting the nodes. Each node may be associated with a unique entity (i.e., user or concept), each of which may have a unique identifier (ID), such as a unique number or username. Example social graph 700 illustrated in FIG. 7 is shown, for didactic purposes, in a two-dimensional visual map representation. In particular embodiments, a social-networking system 660, client system 630, or third-party system 670 may access social graph 700 and related social-graph information for suitable applications. The nodes and edges of social graph 700 may be stored as data objects, for example, in a data store (such as a social-graph database). Such a data store may include one or more searchable or queryable indexes of nodes or edges of social graph 700.

In particular embodiments, a user node 702 may correspond to a user of social-networking system 660. As an example and not by way of limitation, a user may be an individual (human user), an entity (e.g., an enterprise, business, or third-party application), or a group (e.g., of individuals or entities) that interacts or communicates with or over social-networking system 660. In particular embodiments, when a user registers for an account with social-networking system 660, social-networking system 660 may create a user node 702 corresponding to the user, and store the user node 702 in one or more data stores. Users and user nodes 702 described herein may, where appropriate, refer to registered users and user nodes 702 associated with registered users. In addition or as an alternative, users and user nodes 702 described herein may, where appropriate, refer to users that have not registered with social-networking system 660. In particular embodiments, a user node 702 may be associated with information provided by a user or information gathered by various systems, including social-networking system 660. As an example and not by way of limitation, a user may provide his or her name, profile picture, contact information, birth date, sex, marital status, family status, employment, education background, preferences, interests, or other demographic information. In particular embodiments, a user node 702 may be associated with one or more data objects corresponding to information associated with a user. In particular embodiments, a user node 702 may correspond to one or more webpages.

In particular embodiments, a concept node 704 may correspond to a concept. As an example and not by way of limitation, a concept may correspond to a place (such as, for example, a movie theater, restaurant, landmark, or city); a website (such as, for example, a website associated with social-network system 660 or a third-party website associated with a web-application server); an entity (such as, for example, a person, business, group, sports team, or celebrity); a resource (such as, for example, an audio file, video file, digital photo, text file, structured document, or application) which may be located within social-networking system 660 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 704 may be associated with information of a concept provided by a user or information gathered by various systems, including social-networking system 660. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 704 may be associated with one or more data objects corresponding to information associated with concept node 704. In particular embodiments, a concept node 704 may correspond to one or more webpages.

In particular embodiments, a node in social graph 700 may represent or be represented by a webpage (which may be referred to as a "profile page"). Profile pages may be hosted by or accessible to social-networking system 660. Profile pages may also be hosted on third-party websites associated with a third-party system 670. As an example and not by way of limitation, a profile page corresponding to a particular external webpage may be the particular external webpage and the profile page may correspond to a particular concept node 704. Profile pages may be viewable by all or a selected subset of other users. As an example and not by way of limitation, a user node 702 may have a corresponding user-profile page in which the corresponding user may add content, make declarations, or otherwise express himself or herself. As another example and not by way of limitation, a concept node 704 may have a corresponding concept-profile page in which one or more users may add content, make declarations, or express themselves, particularly in relation to the concept corresponding to concept node 704.

In particular embodiments, a concept node 704 may represent a third-party webpage or resource hosted by a third-party system 670. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 630 to send to social-networking system 660 a message indicating the user's action. In response to the message, social-networking system 660 may create an edge (e.g., a check-in-type edge) between a user node 702 corresponding to the user and a concept node 704 corresponding to the third-party webpage or resource and store edge 706 in one or more data stores.

In particular embodiments, a pair of nodes in social graph 700 may be connected to each other by one or more edges 706. An edge 706 connecting a pair of nodes may represent a relationship between the pair of nodes. In particular embodiments, an edge 706 may include or represent one or more data objects or attributes corresponding to the relationship between a pair of nodes. As an example and not by way of limitation, a first user may indicate that a second user is a "friend" of the first user. In response to this indication, social-networking system 660 may send a "friend request" to the second user. If the second user confirms the "friend request," social-networking system 660 may create an edge 706 connecting the first user's user node 702 to the second user's user node 702 in social graph 700 and store edge 706 as social-graph information in one or more of data stores 664. In the example of FIG. 7, social graph 700 includes an edge 706 indicating a friend relation between user nodes 702 of user "A" and user "B" and an edge indicating a friend relation between user nodes 702 of user "C" and user "B." Although this disclosure describes or illustrates particular edges 706 with particular attributes connecting particular user nodes 702, this disclosure contemplates any suitable edges 706 with any suitable attributes connecting user nodes 702. As an example and not by way of limitation, an edge 706 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 700 by one or more edges 706. The degree of separation between two objects represented by two nodes, respectively, is a count of edges in a shortest path connecting the two nodes in the social graph 700. As an example and not by way of limitation, in the social graph 700, the user node 702 of user "C" is connected to the user node 702 of user "A" via multiple paths including, for example, a first path directly passing through the user node 702 of user "B," a second path passing through the concept node 704 of company "Acme" and the user node 702 of user "D," and a third path passing through the user nodes 702 and concept nodes 704 representing school "Stanford," user "G," company "Acme," and user "D." User "C" and user "A" have a degree of separation of two because the shortest path connecting their corresponding nodes (i.e., the first path) includes two edges 706.

In particular embodiments, an edge 706 between a user node 702 and a concept node 704 may represent a particular action or activity performed by a user associated with user node 702 toward a concept associated with a concept node 704. As an example and not by way of limitation, as illustrated in FIG. 7, a user may "like," "attended," "played," "listened," "cooked," "worked at," or "watched" a concept, each of which may correspond to an edge type or subtype. A concept-profile page corresponding to a concept node 704 may include, for example, a selectable "check in" icon (such as, for example, a clickable "check in" icon) or a selectable "add to favorites" icon. Similarly, after a user clicks these icons, social-networking system 660 may create a "favorite" edge or a "check in" edge in response to a user's action corresponding to a respective action. As another example and not by way of limitation, a user (user "C") may listen to a particular song ("Imagine") using a particular application (an online music application). In this case, social-networking system 660 may create a "listened" edge 706 and a "used" edge (as illustrated in FIG. 7) between user nodes 702 corresponding to the user and concept nodes 704 corresponding to the song and application to indicate that the user listened to the song and used the application. Moreover, social-networking system 660 may create a "played" edge 706 (as illustrated in FIG. 7) between concept nodes 704 corresponding to the song and the application to indicate that the particular song was played by the particular application. In this case, "played" edge 706 corresponds to an action performed by an external application on an external audio file (the song "Imagine"). Although this disclosure describes particular edges 706 with particular attributes connecting user nodes 702 and concept nodes 704, this disclosure contemplates any suitable edges 706 with any suitable attributes connecting user nodes 702 and concept nodes 704. Moreover, although this disclosure describes edges between a user node 702 and a concept node 704 representing a single relationship, this disclosure contemplates edges between a user node 702 and a concept node 704 representing one or more relationships. As an example and not by way of limitation, an edge 706 may represent both that a user likes and has used at a particular concept. Alternatively, another edge 706 may represent each type of relationship (or multiples of a single relationship) between a user node 702 and a concept node 704 (as illustrated in FIG. 7 between user node 702 for user "E" and concept node 704).

In particular embodiments, social-networking system 660 may create an edge 706 between a user node 702 and a concept node 704 in social graph 700. As an example and not by way of limitation, a user viewing a concept-profile page (such as, for example, by using a web browser or a special-purpose application hosted by the user's client system 630) may indicate that he or she likes the concept represented by the concept node 704 by clicking or selecting a "Like" icon, which may cause the user's client system 630 to send to social-networking system 660 a message indicating the user's liking of the concept associated with the concept-profile page. In response to the message, social-networking system 660 may create an edge 706 between user node 702 associated with the user and concept node 704, as illustrated by "like" edge 706 between the user and concept node 704.

In particular embodiments, social-networking system 660 may store an edge 706 in one or more data stores. In particular embodiments, an edge 706 may be automatically formed by social-networking system 660 in response to a particular user action. As an example and not by way of limitation, if a first user uploads a picture, watches a movie, or listens to a song, an edge 706 may be formed between user node 702 corresponding to the first user and concept nodes 704 corresponding to those concepts. Although this disclosure describes forming particular edges 706 in particular manners, this disclosure contemplates forming any suitable edges 706 in any suitable manner.

Vector Spaces and Embeddings

Figure 8:
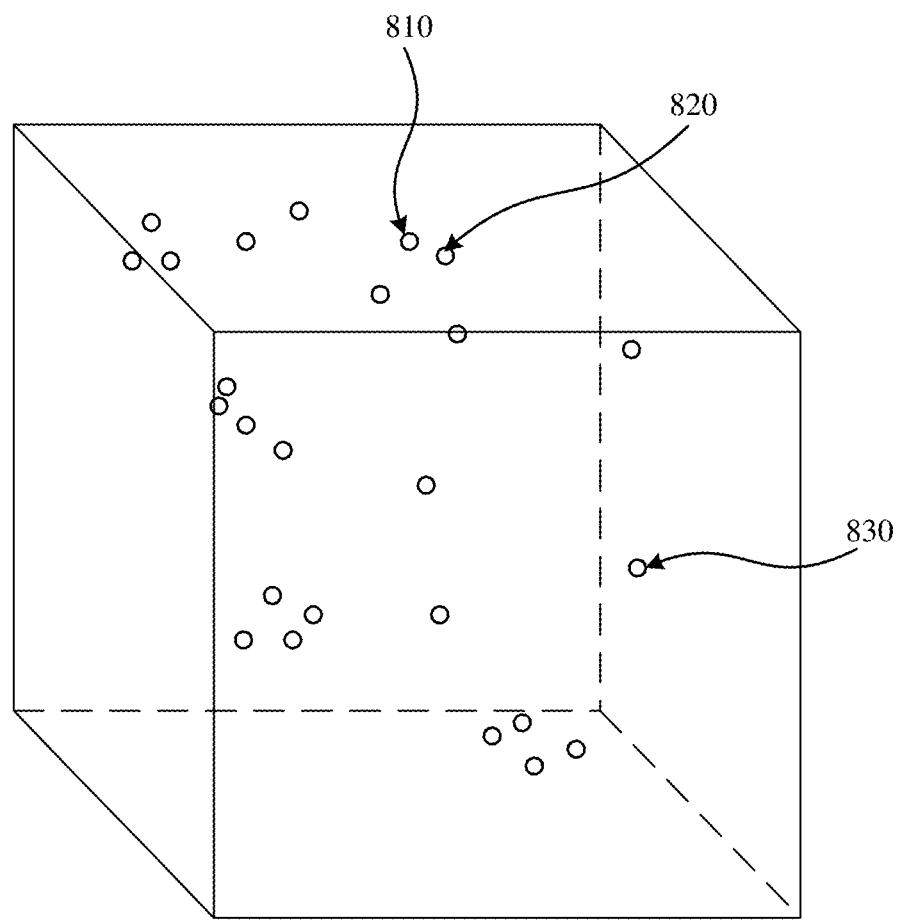
FIG. 8 illustrates an example view of an embedding space.

FIG. 8 illustrates an example view of a vector space 800. In particular embodiments, an object or an n-gram may be represented in a d-dimensional vector space, where d denotes any suitable number of dimensions. Although the vector space 800 is illustrated as a three-dimensional space, this is for illustrative purposes only, as the vector space 800 may be of any suitable dimension. In particular embodiments, an n-gram may be represented in the vector space 800 as a vector referred to as a term embedding. Each vector may comprise coordinates corresponding to a particular point in the vector space 800 (i.e., the terminal point of the vector). As an example and not by way of limitation, vectors 810, 820, and 830 may be represented as points in the vector space 800, as illustrated in FIG. 8. An n-gram may be mapped to a respective vector representation. As an example and not by way of limitation, n-grams $t_1$ and $t_2$ may be mapped to vectors $\vec{v}_1$ and $\vec{v}_2$ in the vector space 800, respectively, by applying a function $\vec{\pi}$ defined by a dictionary, such that $\vec{v}_1 = \vec{\pi}(t_1)$ and $\vec{v}_2 = \vec{\pi}(t_2)$. As another example and not by way of limitation, a dictionary trained to map text to a vector representation may be utilized, or such a dictionary may be itself generated via training. As another example and not by way of limitation, a model, such as Word2vec, may be used to map an n-gram to a vector representation in the vector space 800. In particular embodiments, an n-gram may be mapped to a vector representation in the vector space 800 by using a machine leaning model (e.g., a neural network). The machine learning model may have been trained using a sequence of training data (e.g., a corpus of objects each comprising n-grams).

In particular embodiments, an object may be represented in the vector space 800 as a vector referred to as a feature vector or an object embedding. As an example and not by way of limitation, objects $e_1$ and $e_2$ may be mapped to vectors $\vec{v}_1$ and $\vec{v}_2$ in the vector space 800, respectively, by applying a function $\vec{\pi}$, such that $\vec{v}_1 = \vec{\pi}(e_1)$ and $\vec{v}_2 = \vec{\pi}(e_2)$. In particular embodiments, an object may be mapped to a vector based on one or more properties, attributes, or features of the object, relationships of the object with other objects, or any other suitable information associated with the object. As an example and not by way of limitation, a function may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\vec{\pi}$ may map the object to a vector using a transformed reduced set of features (e.g., feature selection). In particular embodiments, a function $\vec{\pi}$ may map an object e to a vector $\vec{\pi}(e)$ based on one or more n-grams associated with object e. Although this disclosure describes representing an n-gram or an object in a vector space in a particular manner, this disclosure contemplates representing an n-gram or an object in a vector space in any suitable manner.

In particular embodiments, the social-networking system 160 may calculate a similarity metric of vectors in vector space 800. A similarity metric may be a cosine similarity, a Minkowski distance, a Mahalanobis distance, a Jaccard similarity coefficient, or any suitable similarity metric. As an example and not by way of limitation, a similarity metric of $\vec{v}_1$ and $\vec{v}_2$ may be a cosine similarity $$\frac{\vec{v}_1 \cdot \vec{v}_2}{\|\vec{v}_1\| \|\vec{v}_2\|}.$$

As another example and not by way of limitation, a similarity metric of $\vec{v}_1$ and $\vec{v}_2$ and may be a Euclidean distance $\|\vec{v}_1 - \vec{v}_2\|$. A similarity metric of two vectors may represent how similar the two objects or n-grams corresponding to the two vectors, respectively, are to one another, as measured by the distance between the two vectors in the vector space 800. As an example and not by way of limitation, vector 810 and vector 820 may correspond to objects that are more similar to one another than the objects corresponding to vector 810 and vector 830, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Artificial Neural Networks

Figure 9:
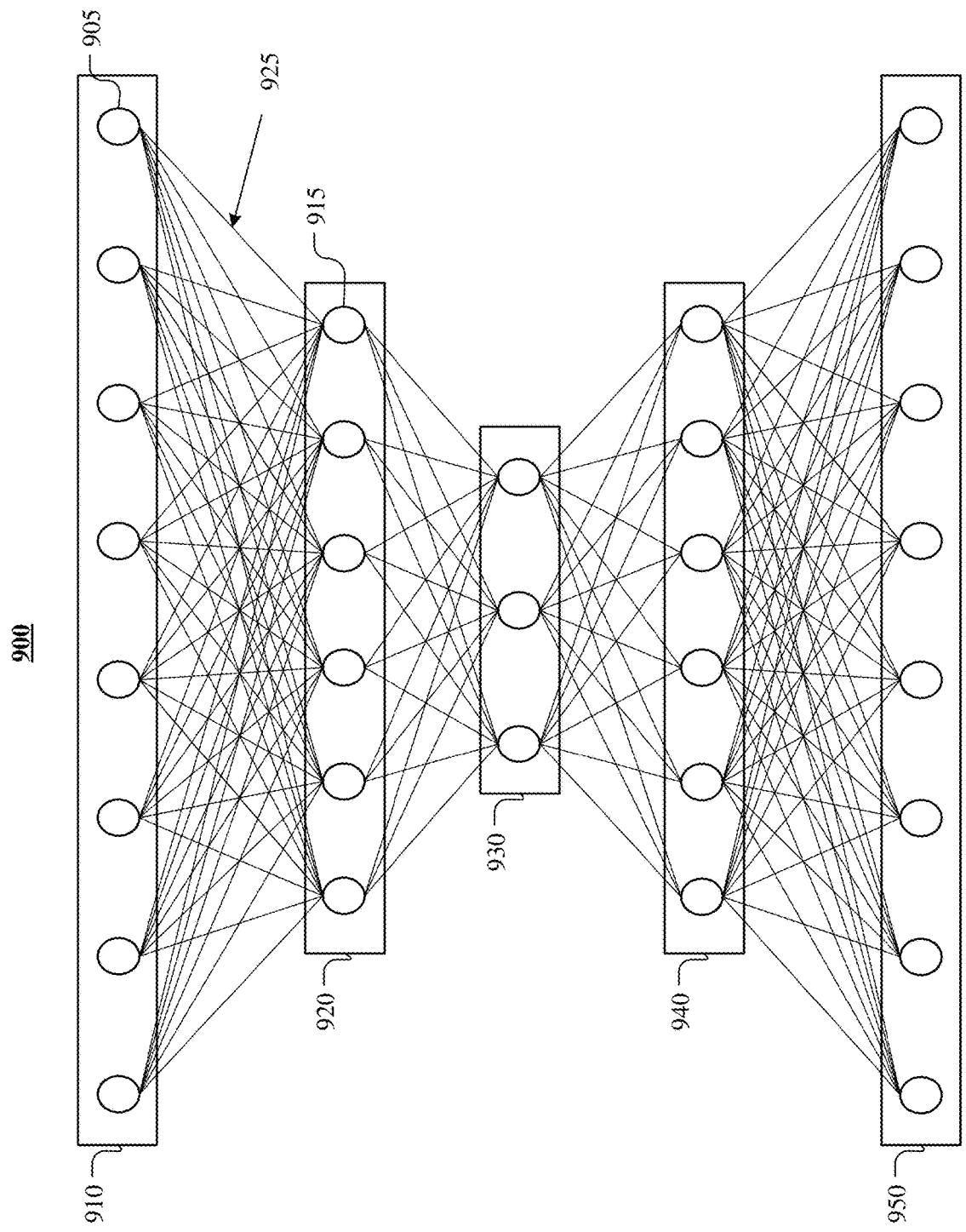
FIG. 9 illustrates an example artificial neural network.

FIG. 9 illustrates an example artificial neural network ("ANN") 900. In particular embodiments, an ANN may refer to a computational model comprising one or more nodes. Example ANN 900 may comprise an input layer 910, hidden layers 920, 930, 940, and an output layer 950. Each layer of the ANN 900 may comprise one or more nodes, such as a node 905 or a node 915. In particular embodiments, each node of an ANN may be connected to another node of the ANN. As an example and not by way of limitation, each node of the input layer 910 may be connected to one of more nodes of the hidden layer 920. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 9 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 9 depicts a connection between each node of the input layer 910 and each node of the hidden layer 920, one or more nodes of the input layer 910 may not be connected to one or more nodes of the hidden layer 920.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 920 may comprise the output of one or more nodes of the input layer 910. As another example and not by way of limitation, the input to each node of the output layer 950 may comprise the output of one or more nodes of the hidden layer 940. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be $F(x)+x$, where $F(x)$ may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1+e^{-s_k}},$$

the hyperbolic tangent function $$F_k(s_k) = \frac{e^{s_k}-e^{-s_k}}{e^{s_k}+e^{-s_k}},$$

the rectifier $F_k(s_k)=\max(0, s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 925 between the node 905 and the node 915 may have a weighting coefficient of 0.4, which may indicate that 0.4 multiplied by the output of the node 905 is used as an input to the node 915. As another example and not by way of limitation, the output $y_k$ of node k may be $y_k=F_k(s_k)$, where $F_k$ may be the activation function corresponding to node k, $s_k=\Sigma_j(w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 900 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 704 corresponding to a particular photo may have a privacy setting specifying that the photo may only be accessed by users tagged in the photo and their friends. In particular embodiments, privacy settings may allow users to opt in or opt out of having their actions logged by social-networking system 660 or shared with other systems (e.g., third-party system 670). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 670, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 662 may be authorization/privacy servers for enforcing privacy settings. In response to a request from a user (or other entity) for a particular object stored in a data store 664, social-networking system 660 may send a request to the data store 664 for the object. The request may identify the user associated with the request and may only be sent to the user (or a client system 630 of the user) if the authorization server determines that the user is authorized to access the object based on the privacy settings associated with the object. If the requesting user is not authorized to access the object, the authorization server may prevent the requested object from being retrieved from the data store 664, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 10:
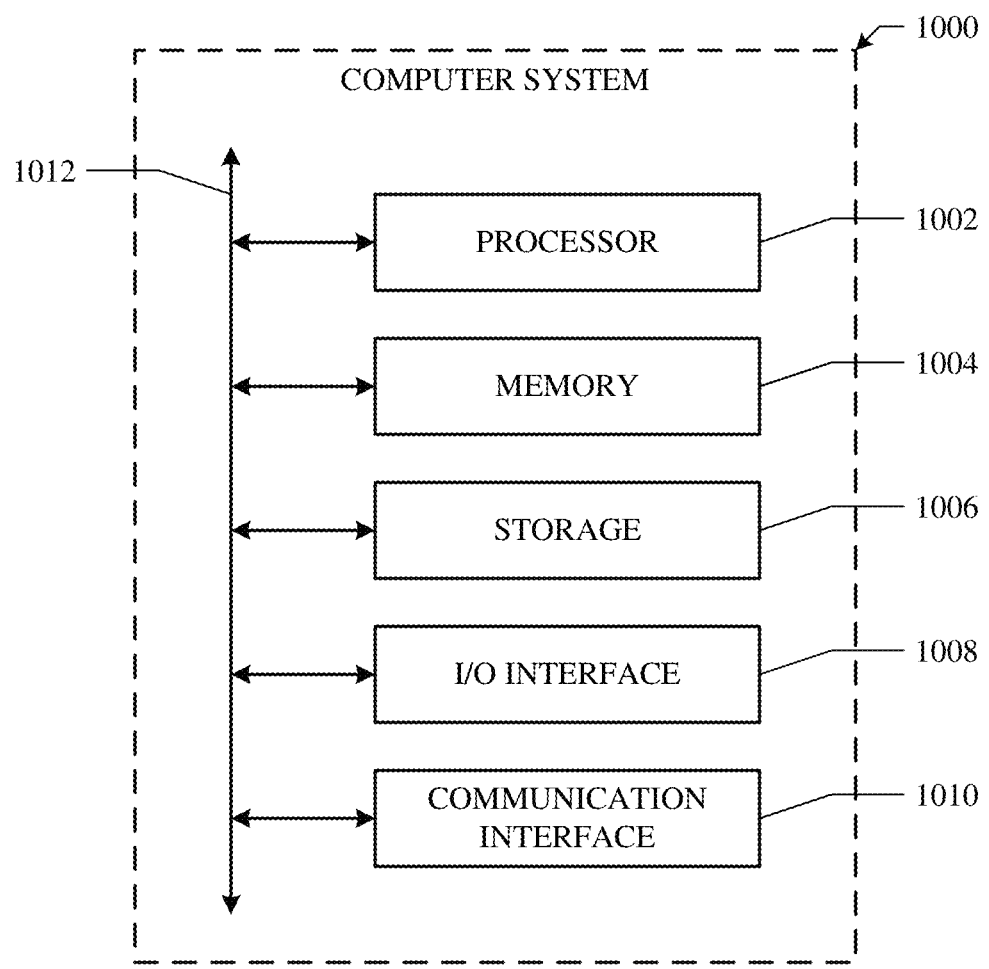
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
by a computing device in a social-networking system, preparing an initialized user-embedding matrix, a column of the user-embedding matrix representing an embedding for a social-networking user in a d-dimensional embedding space, wherein the user-embedding matrix comprises a plurality of columns corresponding to a user;
by the computing device, preparing an initialized concept-embedding matrix, a column of the concept-embedding matrix representing an embedding for a social-networking concept in the d-dimensional embedding space;
by the computing device, constructing an interaction table representing interactions between entities, wherein the entities in the interaction table comprises users in the user-embedding matrix and concepts in the concept-embedding matrix, and wherein an element (i,j) of the table indicates one or more directional interactions from an entity represented by row i to an entity represented by column j;
by the computing device, running a training algorithm for the embeddings in the user-embedding matrix and in the concept-embedding matrix, wherein the training algorithm trains the embeddings such that embeddings representing entities with interactions are located nearby in the embedding space while embeddings representing entities without interactions are located far apart, wherein the interactions between entities are indicated in the interaction table, wherein the running the training algorithm comprises:
selecting, for each pair of a user and an entity that have one or more interactions, k entities that do not have interactions with the user;
computing a margin ranking loss for the pair, wherein the margin ranking loss comprises scores for the k pairs between the user and the selected k entities and a score for the pair of the user and the entity, wherein the scores are Max-scores, wherein a Max-score for a pair of a user and an entity is computed based on a similarity between a user embedding corresponding to the user closest to an entity embedding corresponding to the entity and the entity embedding; and
adjusting parameters based on the training algorithm to minimize the margin ranking loss; and
by the computing device, providing the embeddings in the user-embedding matrix and in the concept-embedding matrix to a downstream service.

2. The method of claim 1, wherein the users and the concepts are represented by nodes in a social graph.

3. The method of claim 2, wherein the preparing the initialized user-embedding matrix comprises:
identifying a list of unique social-networking users by searching the social graph; and
constructing an initialized user-embedding matrix based on the list of unique social-networking users.

4. The method of claim 2, wherein the preparing the initialized concept-embedding matrix comprises:
identifying a list of unique social-networking concepts by searching the social graph; and
constructing an initialized concept-embedding matrix based on the list of unique social-networking concepts.

5. The method of claim 2, wherein the constructing the interaction table comprises:
preparing an empty table, wherein a column represents a social-networking entity and a row represents a social-networking entity, wherein a social-networking entity comprises a social-networking user or a social-networking concept;

identifying interactions between entities by searching the social graph; and recording the identified interactions in the table, wherein an element (i, j) of the table indicates one or more interactions from an entity represented by row i to an entity represented by column j.

6. The method of claim 1, wherein the initialized user-embedding matrix and the initialized concept-embedding matrix are initialized with random numbers.

7. The method of claim 1, wherein the social-networking concepts comprise pages, groups, posts, or events.

8. The method of claim 1, wherein the scores are Smooth-max-scores, wherein a Smooth-max-score for a pair of a user and an entity is computed based on weighted functions of similarity between user embeddings corresponding to the user and an entity embedding corresponding to the entity.

9. The method of claim 1, wherein the providing the embeddings to the downstream service comprises:
determining whether the downstream stream service is not capable of handling a plurality of embeddings for a user; and
creating, in response to the determination, an embedding for a user by performing a weighted average of user embeddings corresponding to the user.

10. The method of claim 1, further comprising running one or more supervised trainings in parallel to the training for the embeddings in the user-embedding matrix and in the concept-embedding matrix.

11. The method of claim 10, wherein the one or more supervised trainings comprise a classification training.

12. The method of claim 10, wherein the one or more supervised trainings comprise a regression training.

13. One or more computer-readable non-transitory storage media embodying software that is operable when executed to:
prepare an initialized user-embedding matrix, a column of the user-embedding matrix representing an embedding for a social-networking user in a d-dimensional embedding space, wherein the user-embedding matrix comprises a plurality of columns corresponding to a user;
prepare an initialized concept-embedding matrix, a column of the concept-embedding matrix representing an embedding for a social-networking concept in the d-dimensional embedding space;
construct an interaction table representing interactions between entities, wherein the entities in the interaction table comprises users in the user-embedding matrix and concepts in the concept-embedding matrix, and wherein an element (i, j) of the table indicates one or more directional interactions from an entity represented by row i to an entity represented by column j;
run a training algorithm for the embeddings in the user-embedding matrix and in the concept-embedding matrix, wherein the training algorithm trains the embeddings such that embeddings representing entities with interactions are located nearby in the embedding space while embeddings representing entities without interactions are located far apart, wherein the interactions between entities are indicated in the interaction table, wherein the running the training algorithm comprises:
selecting, for each pair of a user and an entity that have one or more interactions, k entities that do not have interactions with the user;
computing a margin ranking loss for the pair, wherein the margin ranking loss comprises scores for the k pairs between the user and the selected k entities and a score for the pair of the user and the entity, wherein the scores are Max-scores, wherein a Max-score for a pair of a user and an entity is computed based on a similarity between a user embedding corresponding to the user closest to an entity embedding corresponding to the entity and the entity embedding; and
adjusting parameters based on the training algorithm to minimize the margin ranking loss; and
provide the embeddings in the user-embedding matrix and in the concept-embedding matrix to a downstream service.

14. The media of claim 13, wherein the users and the concepts are represented by nodes in a social graph.

15. The media of claim 14, wherein the preparing the initialized user-embedding matrix comprises:
identifying a list of unique social-networking users by searching the social graph; and
constructing an initialized user-embedding matrix based on the list of unique social-networking users.

16. The media of claim 14, wherein the preparing the initialized concept-embedding matrix comprises:
identifying a list of unique social-networking concepts by searching the social graph; and
constructing an initialized concept-embedding matrix based on the list of unique social-networking concepts.

17. The media of claim 14, wherein the constructing the interaction table comprises:
preparing an empty table, wherein a column represents a social-networking entity and a row represents a social-networking entity, wherein a social-networking entity comprises a social-networking user or a social-networking concept;
identifying interactions between entities by searching the social graph; and
recording the identified interactions in the table, wherein an element (i, j) of the table indicates one or more interactions from an entity represented by row i to an entity represented by column j.

18. A system comprising: one or more processors; and a non-transitory memory coupled to the processors comprising instructions executable by the processors, the processors operable when executing the instructions to:
prepare an initialized user-embedding matrix, a column of the user-embedding matrix representing an embedding for a social-networking user in a d-dimensional embedding space, wherein the user-embedding matrix comprises a plurality of columns corresponding to a user;
prepare an initialized concept-embedding matrix, a column of the concept-embedding matrix representing an embedding for a social-networking concept in the d-dimensional embedding space;
construct an interaction table representing interactions between entities, wherein the entities in the interaction table comprises users in the user-embedding matrix and concepts in the concept-embedding matrix, and wherein an element (i, j) of the table indicates one or more directional interactions from an entity represented by row i to an entity represented by column j;
run a training algorithm for the embeddings in the user-embedding matrix and in the concept-embedding matrix, wherein the training algorithm trains the embeddings such that embeddings representing entities with interactions are located nearby in the embedding space while embeddings representing entities without interactions are located far apart, wherein the interactions between entities are indicated in the interaction table, wherein the running the training algorithm comprises:
- selecting, for each pair of a user and an entity that have one or more interactions, k entities that do not have interactions with the user;
- computing a margin ranking loss for the pair, wherein the margin ranking loss comprises scores for the k pairs between the user and the selected k entities and a score for the pair of the user and the entity, wherein the scores are Max-scores, wherein a Max-score for a pair of a user and an entity is computed based on a similarity between a user embedding corresponding to the user closest to an entity embedding corresponding to the entity and the entity embedding; and adjusting parameters based on the training algorithm to minimize the margin ranking loss; and provide the embeddings in the user-embedding matrix and in the concept-embedding matrix to a downstream service.

* * * * *